US012665702B2

(12) United States Patent
Liu et al.

(10) Patent No.: US 12,665,702 B2
(45) Date of Patent: Jun. 23, 2026

(54) NETWORK CODING IN AUTOMATIC RECEIPT REQUEST

(71) Applicants: Kangqi Liu, San Diego, CA (US); Changlong Xu, Beijing (CN); Jian Li, Shanghai (CN); Liangming Wu, Beijing (CN); Yu Zhang, San Diego, CA (US); Hao Xu, Beijing (CN); QUALCOMM Incorporated, San Diego, CA (US)

(72) Inventors: Kangqi Liu, San Diego, CA (US); Changlong Xu, Beijing (CN); Jian Li, Shanghai (CN); Liangming Wu, Beijing (CN); Yu Zhang, San Diego, CA (US); Hao Xu, Beijing (CN)

(73) Assignee: Qualcomm Incorporated, San Diego, CA (US)

( * ) Notice: Subject to any disclaimer, the term of this patent is extended or adjusted under 35 U.S.C. 154(b) by 659 days.

(21) Appl. No.: 17/995,394

(22) PCT Filed: Apr. 3, 2020

(86) PCT No.: PCT/CN2020/083257
§ 371 (c)(1),
(2) Date: Oct. 3, 2022

(87) PCT Pub. No.: WO2021/196173
PCT Pub. Date: Oct. 7, 2021

(65) Prior Publication Data
US 2023/0171032 A1    Jun. 1, 2023

(51) Int. Cl.
*H04L 1/08* (2006.01)
*H04L 5/00* (2006.01)

(52) U.S. Cl.
CPC .............. *H04L 1/08* (2013.01); *H04L 5/0053* (2013.01)

(58) Field of Classification Search
CPC ....... H04L 1/08; H04L 5/0053; H04L 1/0041; H04L 1/0045; H04L 1/1887; H04L 1/0076; H04B 7/0617
See application file for complete search history.

(56) References Cited

U.S. PATENT DOCUMENTS

| | | | | |
|---|---|---|---|---|
| 8,537,736 B2 * | 9/2013 | Wei | .......................... | H04W 4/06 370/312 |
| 2010/0214970 A1 * | 8/2010 | Brunner | .............. | H04L 12/1868 370/312 |

(Continued)

FOREIGN PATENT DOCUMENTS

| | | |
|---|---|---|
| CN | 103580803 A | 2/2014 |
| CN | 110198204 A | 9/2019 |
| WO | WO-2010096949 A1 | 9/2010 |

OTHER PUBLICATIONS

International Search Report and Written Opinion—PCT/CN2020/083257—ISA/EPO—Dec. 28, 2020 (203431WO1).

(Continued)

*Primary Examiner* — Marcus Smith
(74) *Attorney, Agent, or Firm* — Norton Rose Fulbright US LLP

(57) ABSTRACT

Network coding in automatic receipt request (ARQ) functionality is disclosed. A compatible transmitter configures a new transmission period, in which the set of data for transmission is transmitted, and a retransmission period, after the new transmission period, in which a number of network coded data is retransmitted based on the acknowledgement feedback received from the receivers receiving the transmitted set of data. The acknowledgement feedback identifies one or more data requested for retransmission by one or more of the receivers. The transmitter determines a number of network coded data that could be transmitted to accommodate each of the requesting receivers and the data (Continued)

requested by such receivers for retransmission. These network coded data would then be retransmitted by the transmitter during the retransmission period.

21 Claims, 11 Drawing Sheets

(56)                           References Cited

U.S. PATENT DOCUMENTS

| | | | |
|---|---|---|---|
| 2010/0290383 A1 | 11/2010 | Wu et al. | |
| 2011/0041041 A1 | 2/2011 | Kim | |
| 2015/0333874 A1* | 11/2015 | Damola | H04L 1/1845 |
| | | | 370/312 |
| 2018/0042042 A1* | 2/2018 | Li | H04W 72/21 |
| 2018/0075512 A1* | 3/2018 | Bui | G06Q 30/0631 |
| 2020/0127775 A1* | 4/2020 | Su | H04L 1/1854 |
| 2023/0019024 A1* | 1/2023 | Stare | H04W 72/30 |
| 2024/0121034 A1* | 4/2024 | Yeo | H04W 28/04 |

OTHER PUBLICATIONS

Lian W., et al., "Efficient Priority Packet Recovery Based on Network Coding in DVB-IPDC System", China Communications, China Institute of Communications, Piscataway, NJ, USA, vol. 12, No. 7, Jul. 1, 2015, pp. 167-178, XP011666061, ISSN: 1673-5447, DOI: 10.1109/CC.2015.7188534, Sections III, IV.

Sorour S., et al., "Effect of Feedback Loss on Instantly Decodable Network Coding", Wireless Communications and Mobile Computing Conference IWCMC, 2011, 7th International, IEEE, Jul. 4, 2011, pp. 21-28, XP031925588, DOI: 10.1109/IWCMC.2011.5982501, ISBN: 978-1-4244-9539-9, Sections I-III.

Supplementary European Search Report—EP20928728—Search Authority—Munich—Nov. 28, 2023 (203431EP).

Tran T., et al., "Adaptive Network Coding for Wireless Access Networks", Computer Communications and Networks, 2010 Proceedings of 19th International Conference on, IEEE, Piscataway, NJ, USA, Aug. 2, 2010, 6 Pages, XP031744418, ISBN: 978-1-4244-7114-0, Sections I-V.

* cited by examiner

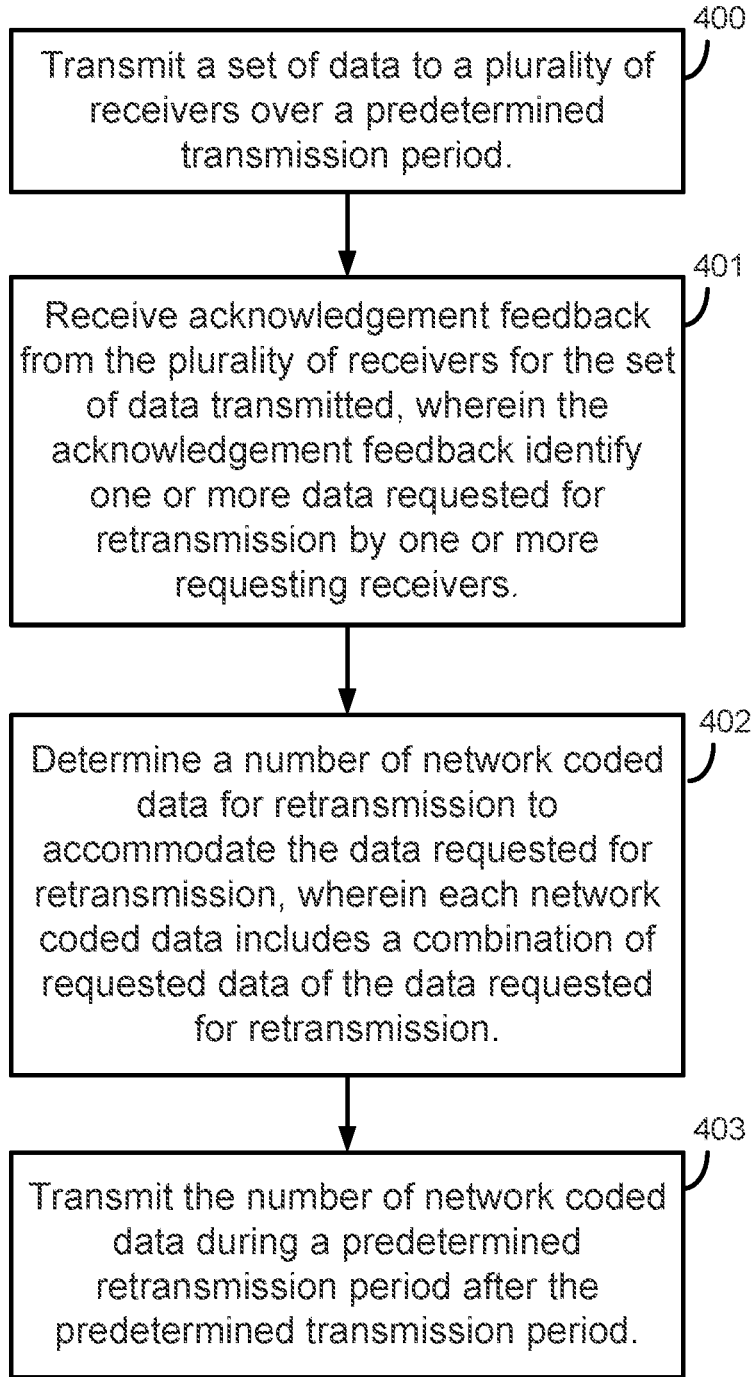

Transmit a set of data to a plurality of receivers over a predetermined transmission period. 400

Receive acknowledgement feedback from the plurality of receivers for the set of data transmitted, wherein the acknowledgement feedback identify one or more data requested for retransmission by one or more requesting receivers. 401

Determine a number of network coded data for retransmission to accommodate the data requested for retransmission, wherein each network coded data includes a combination of requested data of the data requested for retransmission. 402

Transmit the number of network coded data during a predetermined retransmission period after the predetermined transmission period. 403

*FIG. 4*

NETWORK CODING IN AUTOMATIC RECEIPT REQUEST

CROSS-REFERENCE TO RELATED APPLICATIONS

This application claims the benefit of International Patent Application No. PCT/CN2020/083257, entitled, "NETWORK CODING IN AUTOMATIC RECEIPT REQUEST," filed on Apr. 3, 2020, which is expressly incorporated by reference herein in its entirety.

BACKGROUND

Field

Aspects of the present disclosure relate generally to wireless communication systems, and more particularly, to network coding in automatic receipt request (ARQ) functionality.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes transmitting, by a transmitter, a set of data to a plurality of receivers over a predetermined transmission period, receiving, by the transmitter, acknowledgement feedback from the plurality of receivers for the set of data transmitted, wherein the acknowledgement feedback identifies one or more data requested for retransmission of the set of data by one or more requesting receivers of the plurality of receivers, determining, by the transmitter, a number of network coded data for retransmission to accommodate the one or more data requested for retransmission, wherein each network coded data includes a combination of one or more requested data of the one or more data requested for retransmission, and transmitting, by the transmitter, the number of network coded data during a predetermined retransmission period after the predetermined transmission period.

In an additional aspect of the disclosure, an apparatus configured for wireless communication includes means for transmitting, by a transmitter, a set of data to a plurality of receivers over a predetermined transmission period, means for receiving, by the transmitter, acknowledgement feedback from the plurality of receivers for the set of data transmitted, wherein the acknowledgement feedback identifies one or more data requested for retransmission of the set of data by one or more requesting receivers of the plurality of receivers, means for determining, by the transmitter, a number of network coded data for retransmission to accommodate the one or more data requested for retransmission, wherein each network coded data includes a combination of one or more requested data of the one or more data requested for retransmission, and means for transmitting, by the transmitter, the number of network coded data during a predetermined retransmission period after the predetermined transmission period.

In an additional aspect of the disclosure, a non-transitory computer-readable medium having program code recorded thereon. The program code further includes code to transmit, by a transmitter, a set of data to a plurality of receivers over a predetermined transmission period, code to receive, by the transmitter, acknowledgement feedback from the plurality of receivers for the set of data transmitted, wherein the acknowledgement feedback identifies one or more data requested for retransmission of the set of data by one or more requesting receivers of the plurality of receivers, code to determine, by the transmitter, a number of network coded data for retransmission to accommodate the one or more data requested for retransmission, wherein each network coded data includes a combination of one or more requested data of the one or more data requested for retransmission, and code to transmit, by the transmitter, the number of network coded data during a predetermined retransmission period after the predetermined transmission period.

In an additional aspect of the disclosure, an apparatus configured for wireless communication is disclosed. The apparatus includes at least one processor, and a memory coupled to the processor. The processor is configured to transmit, by a transmitter, a set of data to a plurality of receivers over a predetermined transmission period, to receive, by the transmitter, acknowledgement feedback from the plurality of receivers for the set of data transmitted, wherein the acknowledgement feedback identifies one or more data requested for retransmission of the set of data by one or more requesting receivers of the plurality of receivers, to determine, by the transmitter, a number of network coded data for retransmission to accommodate the one or more data requested for retransmission, wherein each network coded data includes a combination of one or more requested data of the one or more data requested for retransmission, and to transmit, by the transmitter, the number of network coded data during a predetermined retransmission period after the predetermined transmission period.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 4 is a block diagram illustrating example blocks executed to implement one aspect of the present disclosure.

Figure 1:
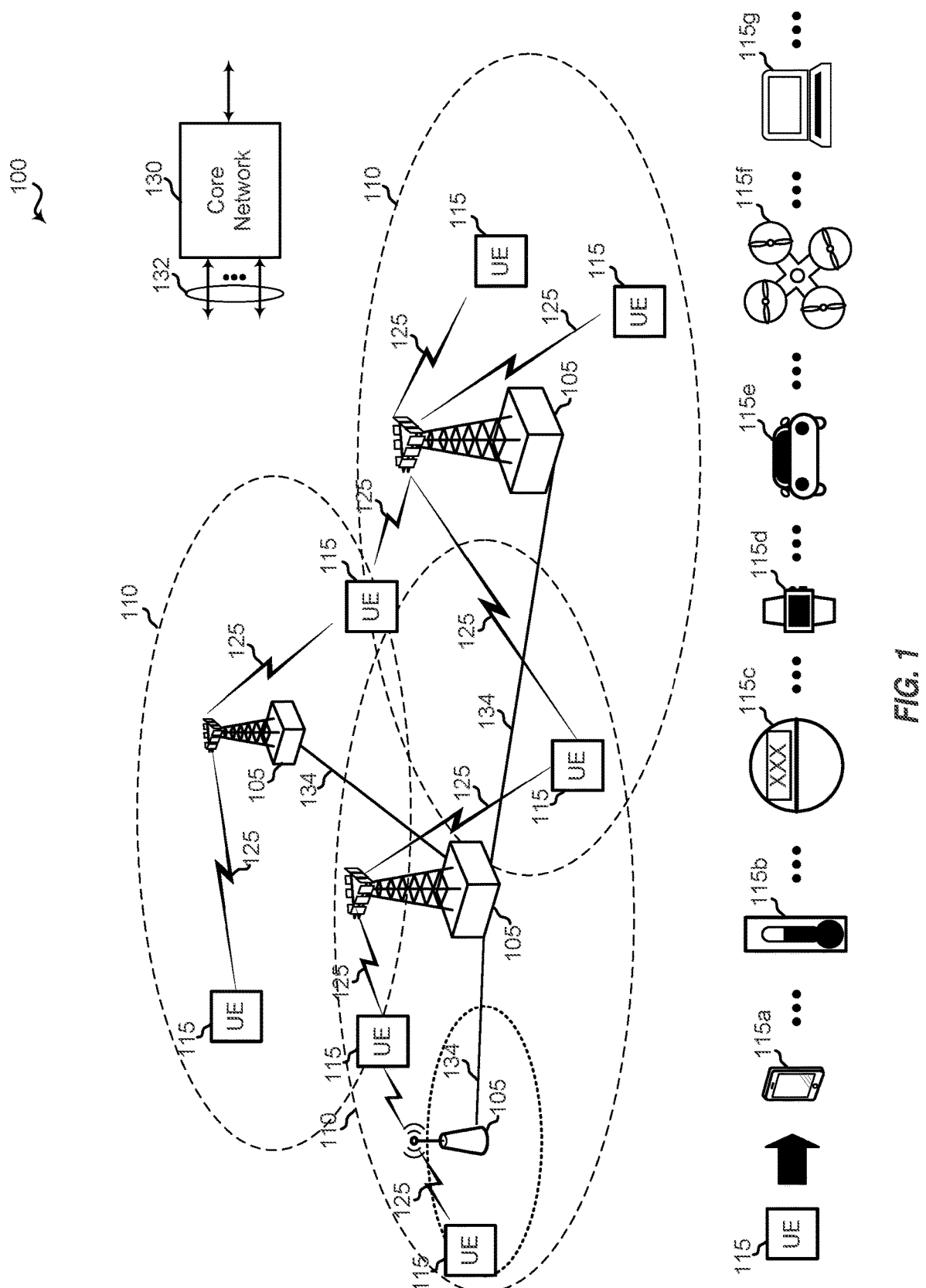
FIG. 1 is a block diagram illustrating details of a wireless communication system.

The Appendix provides further details regarding various embodiments of this disclosure and the subject matter therein forms a part of the specification of this application.

DETAILED DESCRIPTION

The detailed description set forth below, in connection with the appended drawings and appendix, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating an example of a wireless communications system 100 that supports network coding in automatic receipt request (ARQ) functionality in accordance with aspects of the present disclosure. A compatible transmitter, which may include a base station performing downlink transmissions or a UE performing uplink transmissions, configures a new transmission period, in which the set of data for transmission is transmitted, and a retransmission period, after the new transmission period, in which a number of network coded data is retransmitted based on the acknowledgement feedback received from the receivers receiving the transmitted set of data. The acknowledgement feedback identifies one or more data requested for retransmission by one or more of the receivers. The transmitter determines a number of network coded data that could be transmitted to accommodate each of the requesting receivers and the data requested by such receivers for retransmission. These network coded data would then be retransmitted by the transmitter during the retransmission period. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology.

Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station

105 to a UE 115. Downlink transmissions may also be referred to as forward link transmissions while uplink transmissions may also be referred to as reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and, therefore, provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone (UE 115*a*), a personal digital assistant (PDA), a wearable device (UE 115*d*), a tablet computer, a laptop computer (UE 115*g*), or a personal computer. In some examples, a UE 115 may also refer to a wireless local loop (WLL) station, an Internet-of-things (IoT) device, an Internet-of-everything (IoE) device, an MTC device, or the like, which may be implemented in various articles such as appliances, vehicles (UE 115*e* and UE 115*f*), meters (UE 115*b* and UE 115*c*), or the like.

Some UEs 115, such as MTC or IoT devices, may be low cost or low complexity devices, and may provide for automated communication between machines (e.g., via machine-to-machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In other cases, UEs 115 may be designed to support critical functions (e.g., mission critical functions), and a wireless communications system 100 may be configured to provide ultra-reliable communications for these functions.

In certain cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 may facilitate the scheduling of resources for D2D communications. In other cases, D2D communications may be carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one packet data network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP multimedia subsystem (IMS), or a packet-switched (PS) streaming service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

Wireless communications system 100 may include operations by different network operating entities (e.g., network operators), in which each network operator may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In various implementations, wireless communications system 100 may use both licensed and unlicensed radio frequency spectrum bands. For example, wireless communications system 100 may employ license assisted access (LAA), LTE-unlicensed (LTE-U) radio access technology, or NR technology in an unlicensed band (NR-U), such as the 5 GHz ISM band. In some cases, UE 115 and base station 105 of the wireless communications system 100 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available.

A CCA may include an energy detection procedure to determine whether there are any other active transmissions on the shared channel. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include message detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

In general, four categories of LBT procedure have been suggested for sensing a shared channel for signals that may indicate the channel is already occupied. In a first category (CAT 1 LBT), no LBT or CCA is applied to detect occupancy of the shared channel. A second category (CAT 2 LBT), which may also be referred to as an abbreviated LBT, a single-shot LBT, or a 25-μs LBT, provides for the node to perform a CCA to detect energy above a predetermined threshold or detect a message or preamble occupying the shared channel. The CAT 2 LBT performs the CCA without using a random back-off operation, which results in its abbreviated length, relative to the next categories.

A third category (CAT 3 LBT) performs CCA to detect energy or messages on a shared channel, but also uses a random back-off and fixed contention window. Therefore, when the node initiates the CAT 3 LBT, it performs a first CCA to detect occupancy of the shared channel. If the shared channel is idle for the duration of the first CCA, the node may proceed to transmit. However, if the first CCA detects a signal occupying the shared channel, the node selects a random back-off based on the fixed contention window size and performs an extended CCA. If the shared channel is detected to be idle during the extended CCA and the random number has been decremented to 0, then the node may begin transmission on the shared channel. Otherwise, the node decrements the random number and performs another extended CCA. The node would continue performing extended CCA until the random number reaches 0. If the random number reaches 0 without any of the extended CCAs detecting channel occupancy, the node may then transmit on the shared channel. If at any of the extended CCA, the node detects channel occupancy, the node may re-select a new random back-off based on the fixed contention window size to begin the countdown again.

A fourth category (CAT 4 LBT), which may also be referred to as a full LBT procedure, performs the CCA with energy or message detection using a random back-off and variable contention window size. The sequence of CCA detection proceeds similarly to the process of the CAT 3 LBT, except that the contention window size is variable for the CAT 4 LBT procedure.

Use of a medium-sensing procedure to contend for access to an unlicensed shared spectrum may result in communication inefficiencies. This may be particularly evident when multiple network operating entities (e.g., network operators) are attempting to access a shared resource. In wireless communications system 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same code-word) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In certain implementations, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In additional cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot, while in other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier," as may be used herein, refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode).

In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In certain instances, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum, such as NR-shared spectrum (NR-SS)). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In additional cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Figure 2:
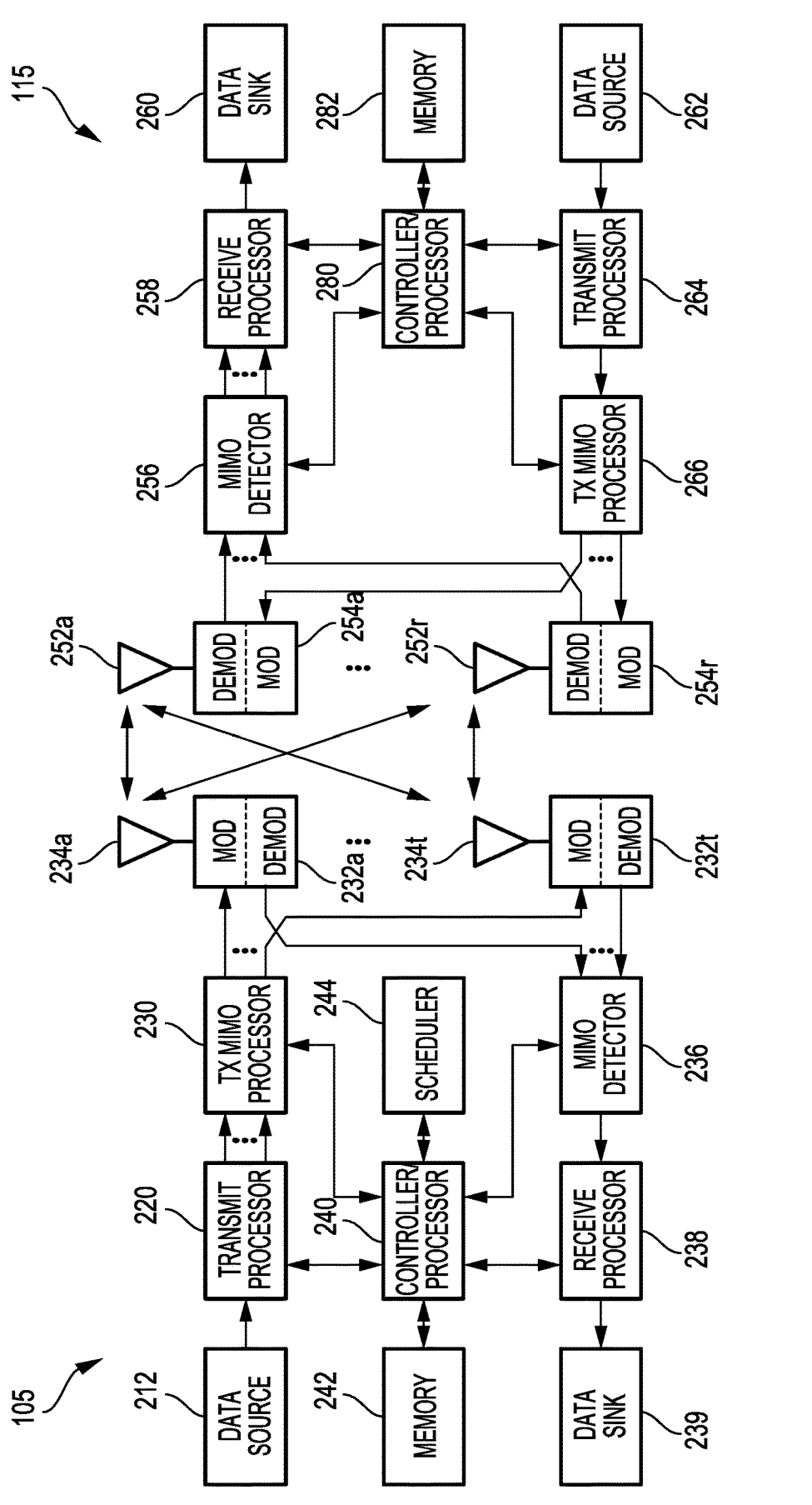
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIG. 4, and/or other processes for the techniques described herein. The memories 242 and 282 may store data and program codes for the base station 105 and the UE 115, respectively. A scheduler 244 may schedule UEs for data transmission on the downlink and/or uplink.

Figure 3:
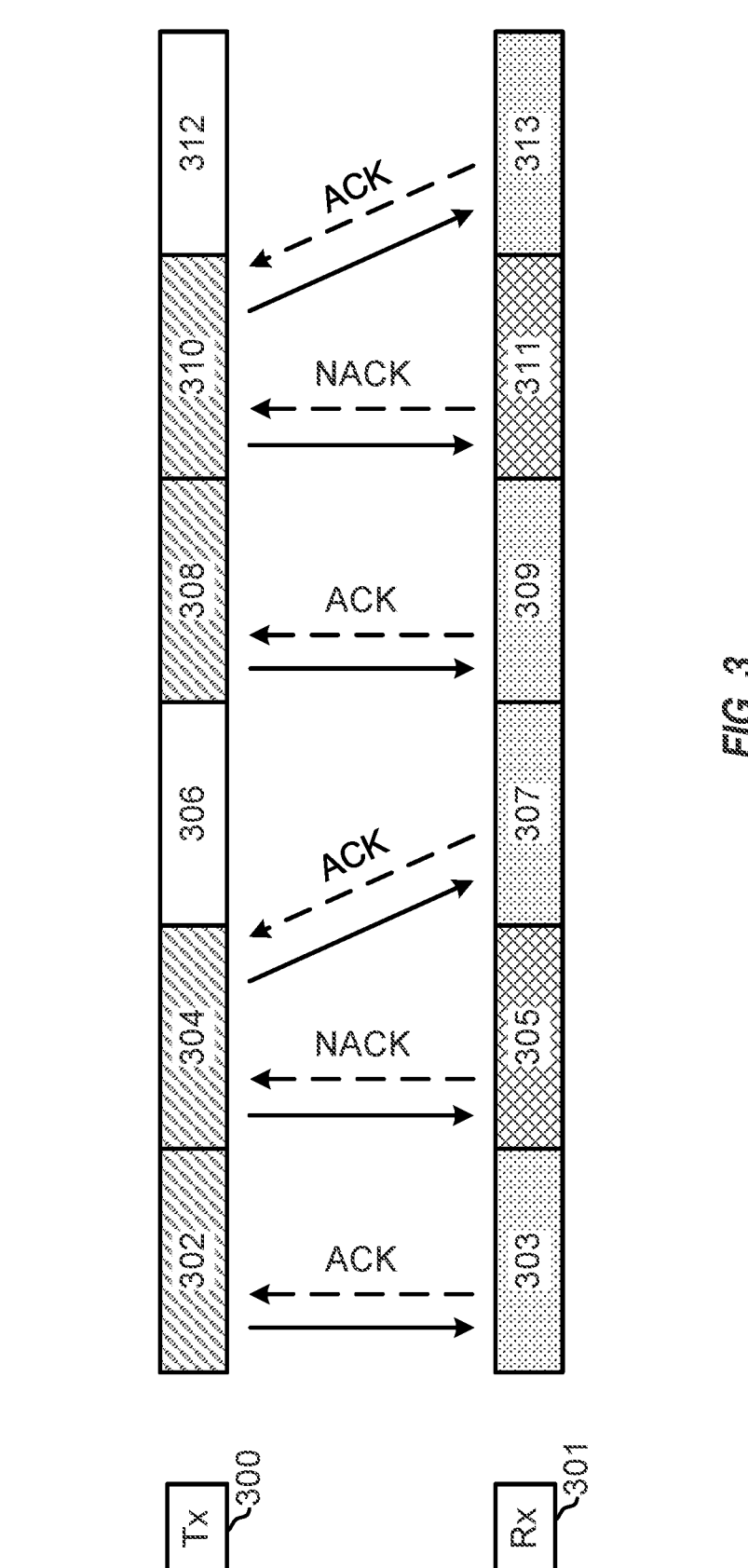
FIG. 3 is a block diagram illustrating the radio link control (RLC) layer communication between a transmitter and a receiver over shared communication spectrum in a portion of wireless network.

FIG. 3 is a block diagram illustrating the radio link control (RLC) layer communication between a transmitter 300 and a receiver 301 over shared communication spectrum in a portion of wireless network 30. Transmitter 300 engages in communications over shared communication spectrum via the slots labeled with even numbers, slots 302, 304, 306, 308, 310, and 312, while receivers engages in communications over the shared spectrum via the slots labeled with odd numbers, slots 303, 305, 307, 309, 311, and 313. The slot with the even number for transmitter 300 is the same slot as the corresponding slot with the odd number for receiver 301. For example, slot 302 and 303 refer to the same slot defined within wireless network 30. The different numbering represents the same slot in each node's transmission/reception stream for purposes of the description.

In the RLC layer, for each data transmission from transmitter 300 over slots 302, 304, 308, and 310, there will be corresponding acknowledgement feedback (e.g., positive acknowledgment (ACK) or negative acknowledgement (NACK)) from receiver 301 in the corresponding slot, slots 303, 305, 309, and 311. When transmitter 300 receives a NACK, there will be a retransmission immediately. For example, at slot 304, transmitter 300 receives the NACK transmitted by receiver 301 at slot 305. In response, transmitter 300 immediately retransmits the data in slot 304, to which receiver 301 would respond with the corresponding acknowledgement feedback for the retransmission in the next slot, slot 307. As illustrated in FIG. 3, receiver 301 fails to successfully receive the transmission in slots 305 and 311, which prompts receiver 301 to transmit NACK to transmitter 300 in slots 305 and 311. Transmitter 300, will then retransmit the data in slots 304 and 310 to receiver 301.

As illustrated in FIG. 3, a single receiver, receiver 301 is receiving and requesting retransmission from transmitter 300. However, where multiple receivers may be requesting retransmission of the same data transmitted from a transmitter, consideration may be given to configuring the retransmission to increase retransmission efficiency. The various aspects of the present disclosure are directed to adjusting the configuration of the retransmission to increase retransmission efficiency.

Figure 10:
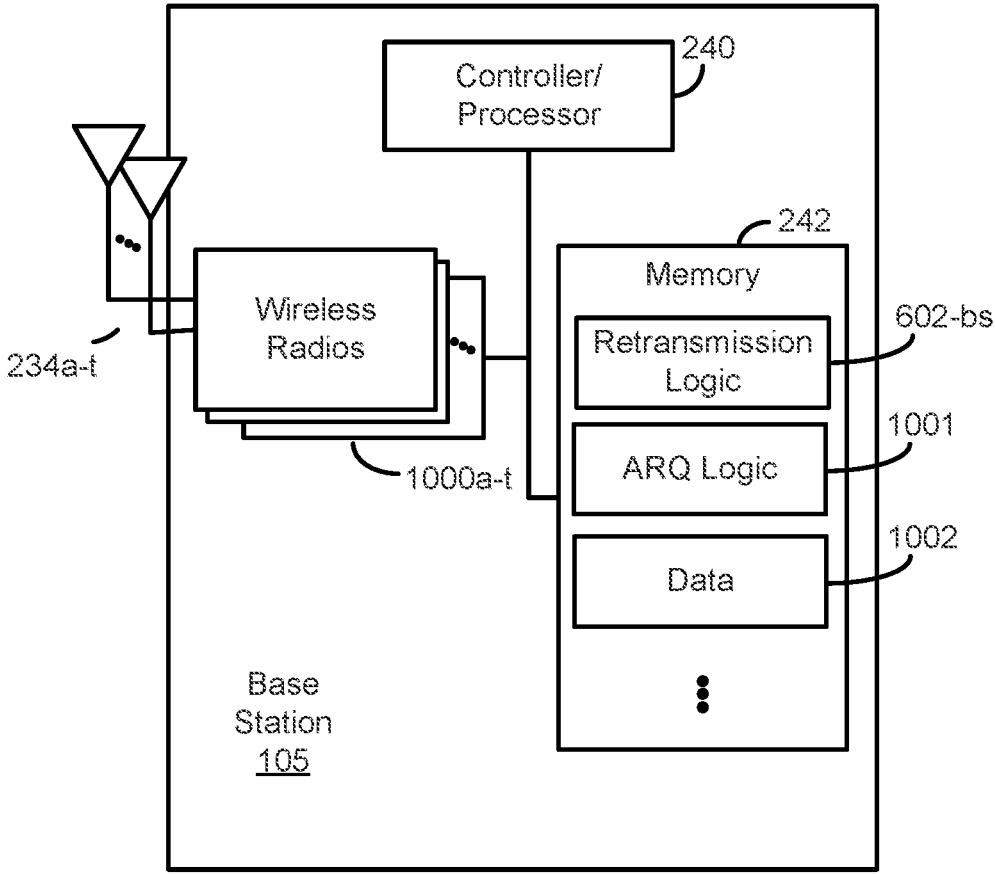
FIG. 10 is a block diagram illustrating a base station configured according to one aspect of the present disclosure.

FIG. 4 is a block diagram illustrating example blocks executed to implement one aspect of the present disclosure. The example blocks will also be described with respect to base station 105 as illustrated in FIGS. 2 and 10. FIG. 10 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 1000a-t and antennas 234a-t. Wireless radios 1000a-t includes various components and hardware, as illustrated in FIG. 2 for base station 105, including modulator/demodulators 232a-t, MIMO detector 236, receive processor 238, transmit processor 220, and TX MIMO processor 230.

Figure 11:
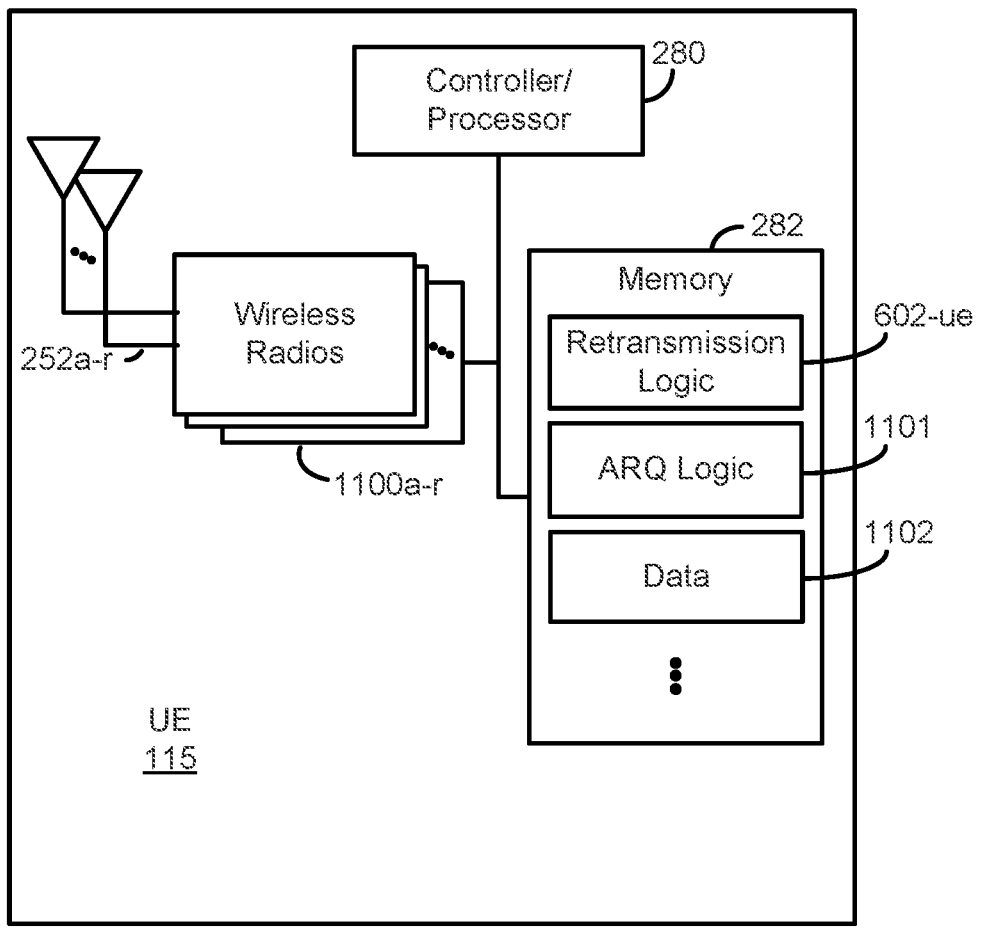
FIG. 11 is a block diagram illustrating a UE configured according to one aspect of the present disclosure.

The example blocks will also be described with respect to UE 115 as illustrated in FIGS. 2 and 11. FIG. 11 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1100a-r and antennas 252a-r. Wireless radios 1100a-r includes various components and hardware, as illustrated in FIG. 2 for UE 115, including modulator/demodulators 254a-r, MIMO detector 256, receive processor 258, transmit processor 264, and TX MIMO processor 266.

At block 400, a transmitter transmits a set of data to a plurality of receivers over a predetermined transmission period. The transmitter may be implemented as a base station, such as base station 105, when performing downlink data transmissions or as a UE, such as UE 115, when performing uplink data transmissions. When implemented as base station 105, base station 105 may have data, stored at data 1002 in memory 242, for downlink transmission. Base station 105, under control of controller/processor 240, would execute retransmission logic 602-bs, stored in memory 242. The functionality available to base station 105 as a result of the execution of instructions in retransmission logic 602-bs by controller/processor 240 (referred to as the "execution environment" of retransmission logic 602-bs) allows base station 105 to implement the functionalities of the various aspects described herein. As such, within the execution environment of retransmission logic 602-bs, base station 105 configures a new transmission period for transmission of data 1002. The execution environment of retransmission logic 602-bs also provides for base station 105 to configure a retransmission period, during which any data requested for retransmission by UEs receiving the transmitted data would be retransmitted as network coded data. Base station 105 would transmit the data in data 1002 to a plurality of receivers/UEs via wireless radios 1000a-t and antennas 234a-t during the configured new transmission period.

When the transmitter is implemented as UE 115, UE 115 may have data, stored at data 1102 in memory 282, for uplink transmission. UE 115, under control of controller/processor 280, would execute retransmission logic 602-ue, stored in memory 282. Within the execution environment of retransmission logic 602-ue, UE 115 configures a new transmission period for transmission of data 1102. The retransmission period would have been established by a serving base station or TRP for UE 115. Thus, any data requested for retransmission by base stations or transmission-reception points (TRPs) receiving the transmitted data would be retransmitted as network coded data. UE 115 would transmit the data in data 1102 to a plurality of receivers (e.g., base stations or TRPs) via wireless radios 1100a-r and antennas 252a-r during the configured new transmission period.

At block 401, the transmitter receives acknowledgement feedback from the plurality of receivers for the set of data transmitted, wherein the acknowledgement feedback identifies one or more data requested for retransmission of the set of data by one or more requesting receivers of the plurality of receivers. When the transmitter is implemented as base station 105, it may receive acknowledgement feedback from UEs via antennas 234*a-t* and wireless radios 1000*a-t*. Under control of controller/processor 240, base station 105 executes ARQ logic 1001, stored in memory 242. Within the execution environment of ARQ logic 1001, base station 105 is able to identify and interpret the acknowledgement feedback. Receipt of negative acknowledgements (NACKs) inform base station 105 of the data requested for retransmission by the UEs sending the NACKs.

When the transmitter is implemented by UE 115, it may receive acknowledgement feedback from the base stations/TRPs via antennas 252*a-4* and wireless radios 1100*a-r*. Under control of controller/processor 280, UE 115 executes ARQ logic 1101, stored in memory 282. Within the execution environment of ARQ logic 1101, UE 115 is able to identify and interpret the acknowledgement feedback. Receipt of NACKs inform UE 115 of the data requested for retransmission by the base stations/TRPs sending the NACKs.

At block 402, the transmitter determines a number of network coded data for retransmission to accommodate the one or more data requested for retransmission, wherein each network coded data includes a combination of one or more requested data of the one or more data requested for retransmission. When the transmitter is implemented as base station 105, within the execution environment of retransmission logic 602-*bs*, base station 105 determines the number of network coded data for retransmission based on the acknowledgement feedback received from the receiving UEs. As described in greater detail below, the functionality provided within the execution environment of retransmission logic 602-*bs* causes base station 105 to generate a matrix representing the data requested and the data decoded by each of the receiving UEs requesting data for retransmission. Using this matrix, base station 105, under the execution environment of retransmission logic 602-*bs* determines the number of network coded data by finding the row basis of either the originally generated matrix or a reduced form of an intermediate matrix, generated using the original matrix, that may be manipulated to affect the ultimate number of network coded data for retransmission. Thus, depending on the aspect implemented, base station 105 may determine a number of networked coded data for retransmission based on the originally generated matrix, a lower number of networked coded data based on a reduced form of the matrix, or a minimum number of data based on a determination of a minimum rank over all possible reduced matrices.

When the transmitter is implemented as UE 115, within the execution environment of retransmission logic 602-*ue*, UE 115 determines the number of network coded data for retransmission based on the acknowledgement feedback received from the receiving base stations/TRPs. The functionality provided within the execution environment of retransmission logic 602-*ue* causes UE 115 to generate a matrix representing the data requested and the data decoded by each of the receiving base stations/TRPs requesting data for retransmission. Using this matrix, UE 115, under the execution environment of retransmission logic 602-*ue* determines the number of network coded data by finding the row basis of either a reduced form of the originally generated matrix or the reduced form of an intermediate matrix, generated using the original matrix, that may be manipulated to affect the ultimate number of network coded data for retransmission.

At block 403, the transmitter transmits the number of network coded data during a predetermined retransmission period after the predetermined transmission period. When the transmitter is implemented as base station 105, within the execution environment of retransmission logic 602-*bs*, base station 105 generates the network coded data according to the row basis of the matrix referenced above. The network coded data may include a coded combination of some of the data requested for retransmission. Base station 105 would then transmit each of the network coded data to the requesting UEs via wireless radios 1000*a-t* and antennas 234*a-t*.

When the transmitter is implemented as UE 115, within the execution environment of retransmission logic 602-*ue*, UE 115 generates the network coded data according to the row basis of the matrix referenced above. The network coded data may include a coded combination of some of the data requested for retransmission. UE 115 would then transmit each of the network coded data to the requesting base stations/TRPs via wireless radios 1100*a-r* and antennas 252*a-r*.

Figure 5:
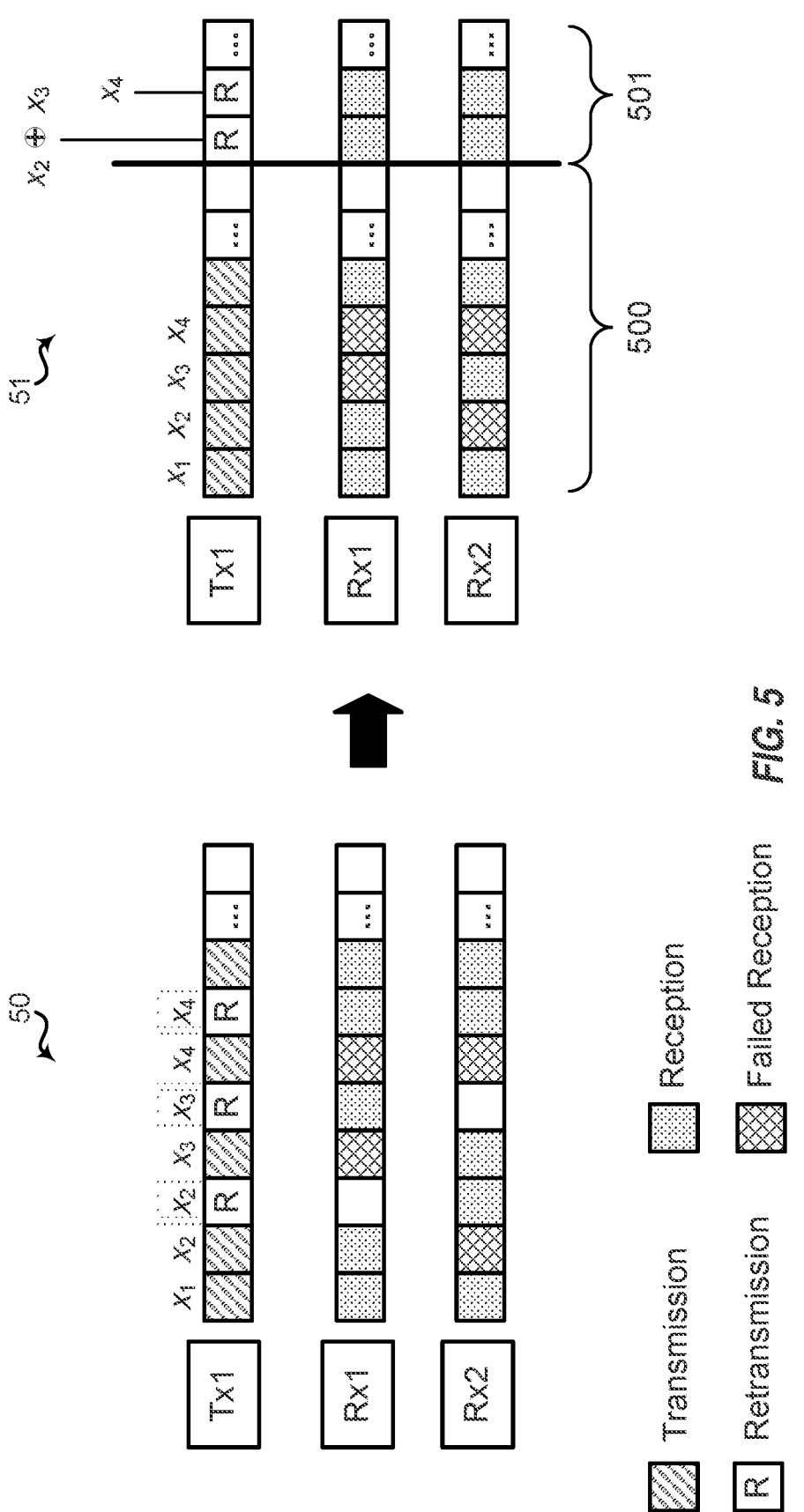
FIG. 5 is a block diagram illustrating a comparison of automatic receipt request (ARQ) functionality between a legacy wireless network and a wireless network configured according to one aspect of the present disclosure.

FIG. 5 is a block diagram illustrating a comparison of automatic receipt request (ARQ) functionality between a legacy wireless network 50 and a wireless network 51 configured according to one aspect of the present disclosure. In each of legacy wireless network 50 and wireless network 51, multiple receivers, Rx1 and Rx2, receive the same data from a transmitter, Tx1. Rx1 and Rx2 may be two separate network devices or may be separate receive chains of the same receiving network device. In legacy wireless network 50, as Rx2 fails to receive transmission of $x_2$, it will transmit NACK feedback to Tx1, which triggers Tx1 to retransmit $x_2$ in the next slot. Rx1 successfully received the first transmission of $x_2$, thus, it will ignore the retransmission in the following slot from Tx1. Similarly, as Rx1 fails to successfully receive $x_3$, it transmits NACK to Tx1, which triggers Tx1 to retransmit $x_3$ in the following slot. As with the transmission/retransmission of $x_2$, as Rx2 successfully received the original transmission of $x_3$, it will ignore the retransmission, essentially wasting a slot of communication. Both Rx1 and Rx2 fail to successfully receive the transmission of $x_4$, which causes both Rx1 and Rx2 to transmit NACK to Tx1. Tx1 will then immediately retransmit $x_4$ in the following slot. Over the course of transmission of $x_1$-$x_4$, Tx1 used three separate additional slots to transmit three different data, in which only one such retransmission was due to both Rx1 and Rx2 failing to successfully receive one of the transmitted data.

In contrast, according to the various aspects of the present disclosure, wireless network 51 is configured to define a new transmission period 500, in which original transmissions are made, and a retransmission period 501, in which any retransmissions triggered by NACK from either or both of Rx1 and Rx2 will be made. Network coding of the requested data for retransmission may reduce the total retransmission time in comparison with legacy wireless network 50 and, thus, increase the retransmission efficiency. In operation, during new transmission period 500, Rx2 fails to successfully receive the transmission of $x_2$ and transmits a NACK to Tx1. However, instead of immediately retransmitting $x_2$, Tx1 proceeds in the next slot to transmit $x_3$. Rx1 fails to receive the transmission of $x_3$ and sends a NACK to Tx1. In the next slot, Tx1 proceeds to transmit $x_4$, which neither Rx1 nor Rx2 successfully receive, resulting in each of Rx1 and Rx2 transmitting a NACK to Tx1.

During retransmission period 501, Tx1 may determine the data requested for retransmission from Rx1 and Rx2 based on the acknowledgement feedback received from the two receivers. The data requested for retransmission may be network coded in order to minimize the retransmissions while covering all of the data requested for retransmission. For example, in a first slot of retransmission period 501, Tx1 transmits a network coded retransmission including $x_2$ XOR $x_3$. With the XOR coding, Rx1, which successfully received $x_3$, may decode and ignore $x_3$ as coded into the retransmission and decode $x_2$, which it had not originally received. Similarly, Rx2, which successfully received $x_2$, may decode an ignore $x_2$ as coded into the retransmission and decode $x_3$, which it had not originally received. As both Rx1 and Rx2 failed to successfully receive $x_4$, Tx1 may retransmit $x_4$ without the network coding. The retransmitted data may further include the original packet identifier (ID) of the data, which allows the receiver, Rx1 and/or Rx2, to identify where the retransmitted packet fits into the set of transmitted data. Accordingly, with the same set of requested data for retransmission as legacy wireless network 50, wireless network 51, configured according to one aspect of the present disclosure, is able to complete retransmission of the same number of requested data in fewer slots.

The length of new transmission period 500 and retransmission period 501 may be adaptively defined based on the buffer and delay budgets of Rx1 and Rx2 or may be defined based on the delay sensitivity of the data to be transmitted by Tx1. When defined according to the buffer and delay budgets, Rx1 and Rx2 may periodically report their buffer and delay budgets to Tx1. The buffer budget of either of Rx1 and Rx2 may provide how much data Rx1 and Rx2 may buffer, respectively, in order to receive the data requested for retransmission during retransmission period 501. The delay budget of either Rx1 and Rx2 may provide the time that any packet received during new transmission period 500 may be delayed or be valid, which may be defined according to the quality of service (QoS) characteristics of the transmission. The delay budget may further be applicable for Tx1 determining the length of new transmission period 500 and retransmission period 500. Tx1 knows the delay sensitivity of the data to be transmitted and may, therefore, define the length of new transmission period 500 and retransmission period 501 to accommodate the urgency of the data.

Figure 6:
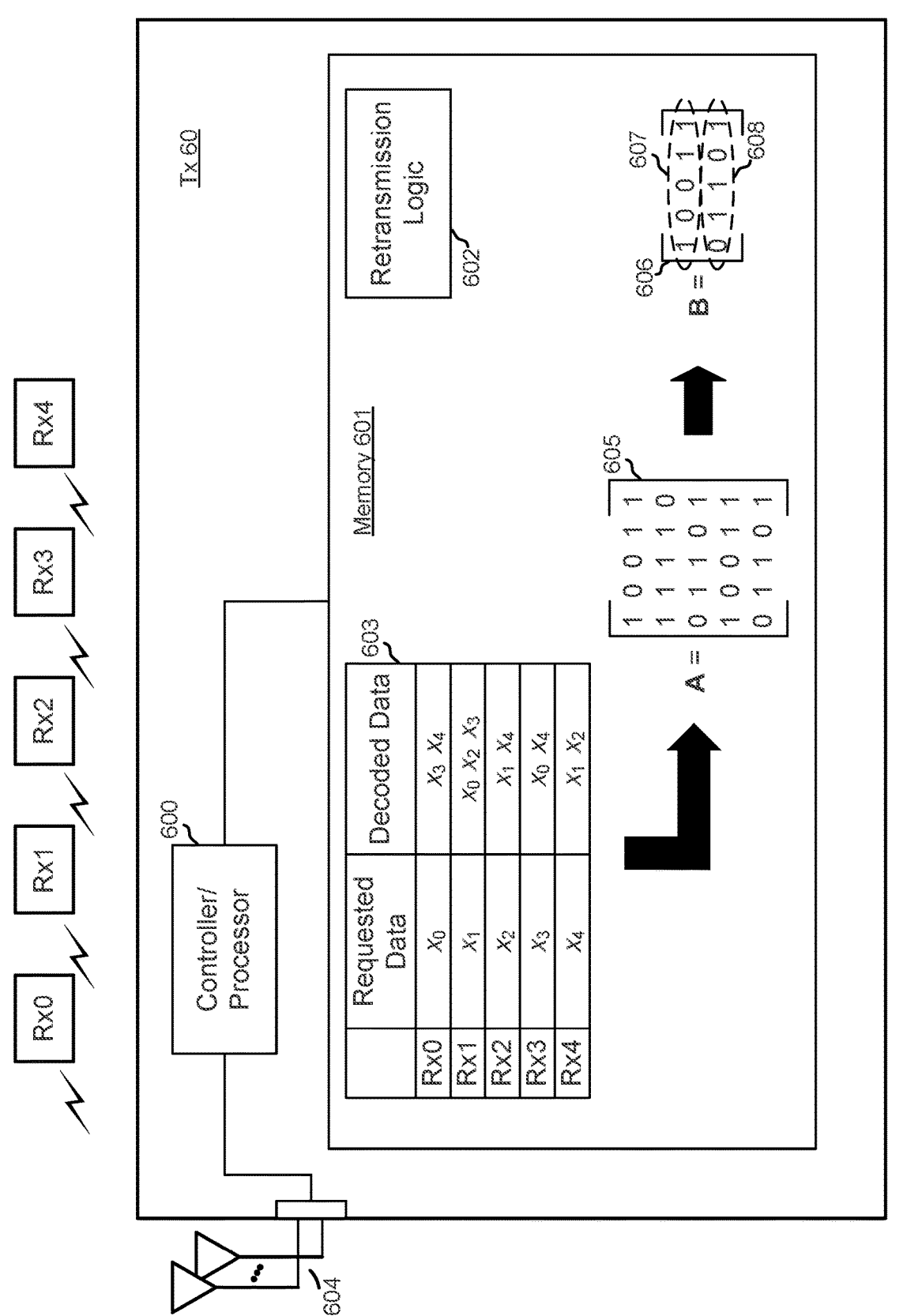
FIG. 6 is a block diagram illustrating an expanded detail of a transmitter, configured according to one aspect of the present disclosure, in communication with multiple receivers.

FIG. 6 is a block diagram illustrating an expanded detail of a transmitter 60, configured according to one aspect of the present disclosure, in communication with multiple receivers, Rx0-Rx4. Each transmitter configured according to the various aspects of the present disclosure may include retransmission logic that can determine the lowest or minimum number of network coded data for the transmitter to transmit during the retransmission period. Such retransmission logic may systematically determine such network coded data for retransmission regardless of the number of receivers in communication with the transmitter. For example, transmitter 60, which includes retransmission logic 602 within memory 601, is in communication with five receivers, Rx0-Rx4. Under control of controller/processor 600, transmitter 60 executes retransmission logic 602 when it receives NACK feedback from any of Rx0-Rx4 during the new transmission period.

Within the execution environment of retransmission logic 602, transmitter 60 is provided with the functionality for determining the network coded data for retransmission. Within the execution environment of retransmission logic 602, transmitter 60 identifies into a record 603, stored in memory 601, of which the transmitted data, $x_0$-$x_4$, is requested from each of Rx0-Rx4 and which of the transmitted data, $x_0$-$x_4$, Rx0-Rx4 has successfully decoded. The transmitted data that is either not identified in the requested data or the decoded data within record 603 may reflect data that the corresponding receiver did not need. The execution environment of retransmission logic 602 provides for transmitter 60 to generate a matrix, A 605, from record 603, in which each row of the matrix represents one of receivers, Rx0-Rx4, and each column of the matrix represents a requested or decoded state for each of the data transmitted, $x_0$-$x_4$. Each Rxi desires $x_1$ and indicates receipt of some data due to the new transmission period. For example, regarding Rx0, the corresponding vector for the row associated with Rx0 is [1 0 0 1 1]. The '1' in the first position of the Rx0 vector represents Rx0 requesting data, $x_0$, the '1's in the fourth and fifth positions of the Rx0 vector represent that Rx0 has decoded data, $x_3$ and $x_4$, and the '0's represent no information for the corresponding data. Tx1, thus, assembles matrix A 605 in memory 601 with similar such vectors from each of Rx0-Rx4, as follows:

$$A = \begin{bmatrix} 1 & 0 & 0 & 1 & 1 \\ 1 & 1 & 1 & 1 & 0 \\ 0 & 1 & 1 & 0 & 1 \\ 1 & 0 & 0 & 1 & 1 \\ 0 & 1 & 1 & 0 & 1 \end{bmatrix} \qquad (1)$$

In order to cover the requested data for all of receivers, Rx0-Rx4, in its retransmissions, the functionality provided within the execution environment of retransmission logic next causes transmitter 60 to find the row basis, B 606, of matrix A 605. Find the row basis of a matrix is well-known in the art. For example, matrix A 605 is transformed into row echelon form, row basis B 606 of this row echelon form (REF) of matrix A 605 is assembled from each row of REF matrix A 605 with non-zero entries. Moreover, the rank of REF matrix A 605 is equal to the number of rows with non-zero entries. According to such known principals, row basis B 606 of matrix A 605 is:

$$B = \begin{bmatrix} 1 & 0 & 0 & 1 & 1 \\ 0 & 1 & 1 & 0 & 1 \end{bmatrix} \qquad (2)$$

The rank of REF matrix A 605 also identifies the number of network coded data for transmission that will cover all of the requested data from each of Rx0-Rx4 that requested retransmission of any data. Accordingly, row basis B 606 identifies the first network coded retransmission 607, vector [1 0 0 1 1], as the network coding of $x_0 \oplus x_3 \oplus x_4$, which would be used by receivers, Rx0, Rx1, and Rx3, and the second network coded retransmission 608, vector [0 1 1 0 1], as the network coding of $x_1 \oplus x_2 \oplus x_4$, which would be used by receivers, Rx1, Rx2, and Rx4. Transmitter 60 would, therefore, transmit the network coded first and second network coded retransmissions 607-608, determined from row basis B 606, via antennas 604 to receivers Rx0-Rx4.

Figure 7:
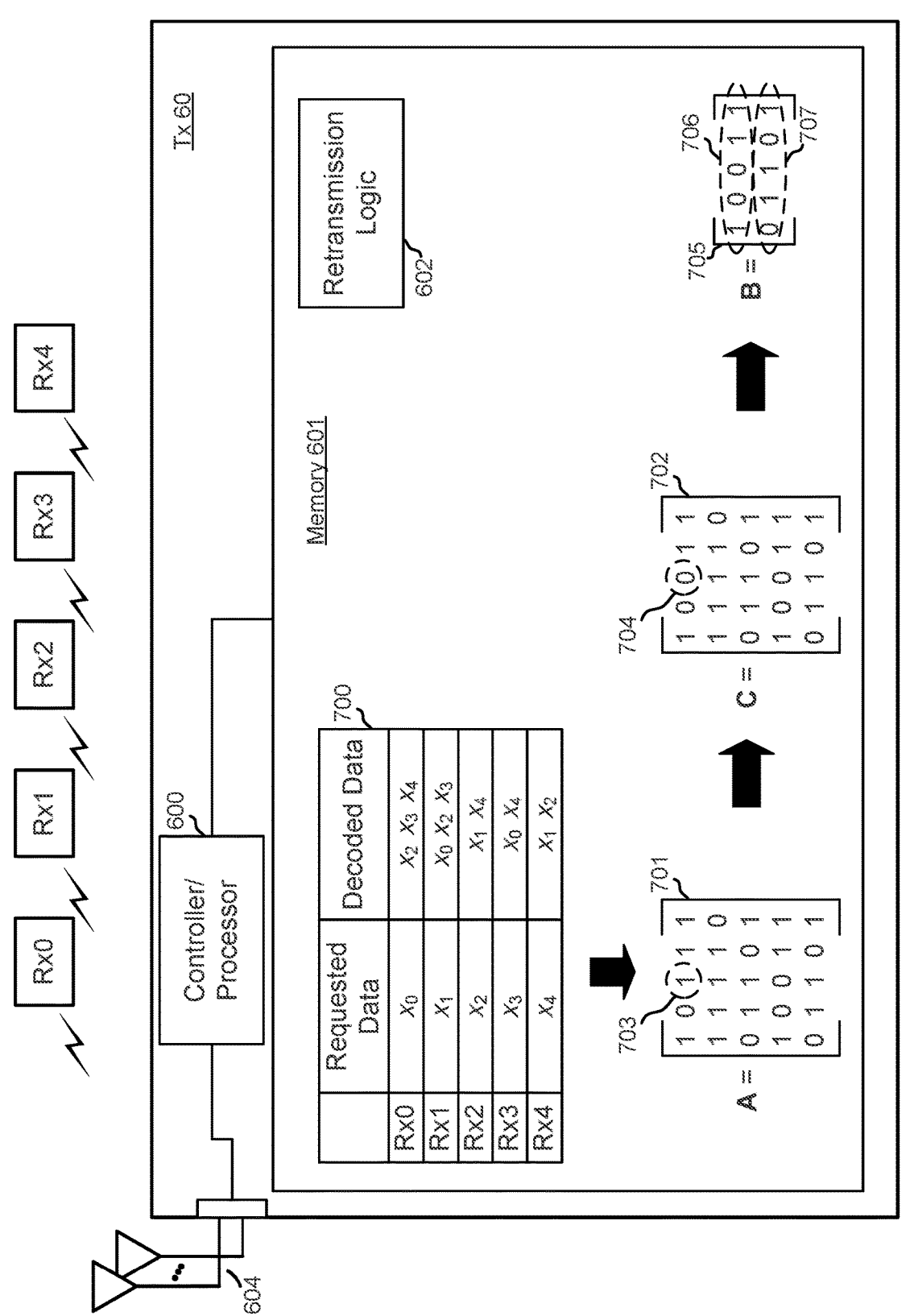
FIG. 7 is a block diagram illustrating an expanded detail of a transmitter, configured according to another aspect of the present disclosure, in communication with multiple receivers.

FIG. 7 is a block diagram illustrating an expanded detail of a transmitter 60, configured according to another aspect of the present disclosure, in communication with multiple receivers, Rx0-Rx4. Within the execution environment of retransmission logic 602, transmitter 60 stores record 700 of the data requested for retransmission and the decoded data of Rx0-Rx4. However, instead of taking the row basis directly from matrix A 701, as indicated in FIG. 6, the example aspect of FIG. 7 first generates an intermediate matrix C 702 from matrix A 701. Intermediate matrix C 702 will be the same dimensions as matrix A 701. Thus, given matrix $A_{K \times K}$ 701, intermediate matrix $C_{K \times K}$ 702 may be generated such that the diagonal entries of intermediate matrix C 702 are defined as $C_{(i,i)}=1$, for $0 \le i \le K$, where some of the non-diagonal entries of intermediate matrix C 702 are defined as $C_{(i,j)}=0$ if $A_{(i,j)}=0$. According to this definition of intermediate matrix C 702, any of the non-zero elements of the non-diagonal entries in matrix A 701 can be replaced with zero. Because the non-zero non-diagonal entries in matrix A 701 represent data that has been decoded by the corresponding receiver, changing the '1' to a '0' means for transmitter 60 not to use this decoded data in the network coded retransmission. As such, the functionality for generating intermediate matrix C 702 allows for reducing the possible rank of the resulting row basis B 705. A minimum rank r may, therefore, be found over all possible $C_{K \times K}$, resulting in r network coded data being generated for retransmission. Within the execution environment of retransmission logic 602, transmitter 60 would simulate forming the intermediate matrix C 702 switching different non-zero non-diagonal entries from '1' to '0' in order to find the minimum rank r.

In an example of minimizing the possible rank of intermediate matrix C 702 and, thus, row basis B 705, within the execution environment of retransmission logic 602, transmitter 60 forms matrix A 701 in memory 601 from record 700. Transmitter 60 may then form intermediate matrix C 702 using the above definition. However, in searching for a minimum rank over all possible $C_{K \times K}$, transmitter 60 determines that when the '1' entry at 703 of matrix A 701, which is a non-zero non-diagonal entry, is changed to '0' at 704 within intermediate matrix C 702, the rank of intermediate matrix C 702 goes from a rank 3 to a rank 2. Because the '1' entry at 703 represents decoded data by Rx0, the determination of the network coded data will not be affected by the change from '1' to '0' at 704 in intermediate matrix C 702. Thus, row basis B 705 includes two vectors representing first network coded retransmission 706 $(x_0 \oplus x_3 \oplus x_4)$ and second retransmission network coded data 707 $(x_1 \oplus x_2 \oplus x_4)$.

Figure 8:
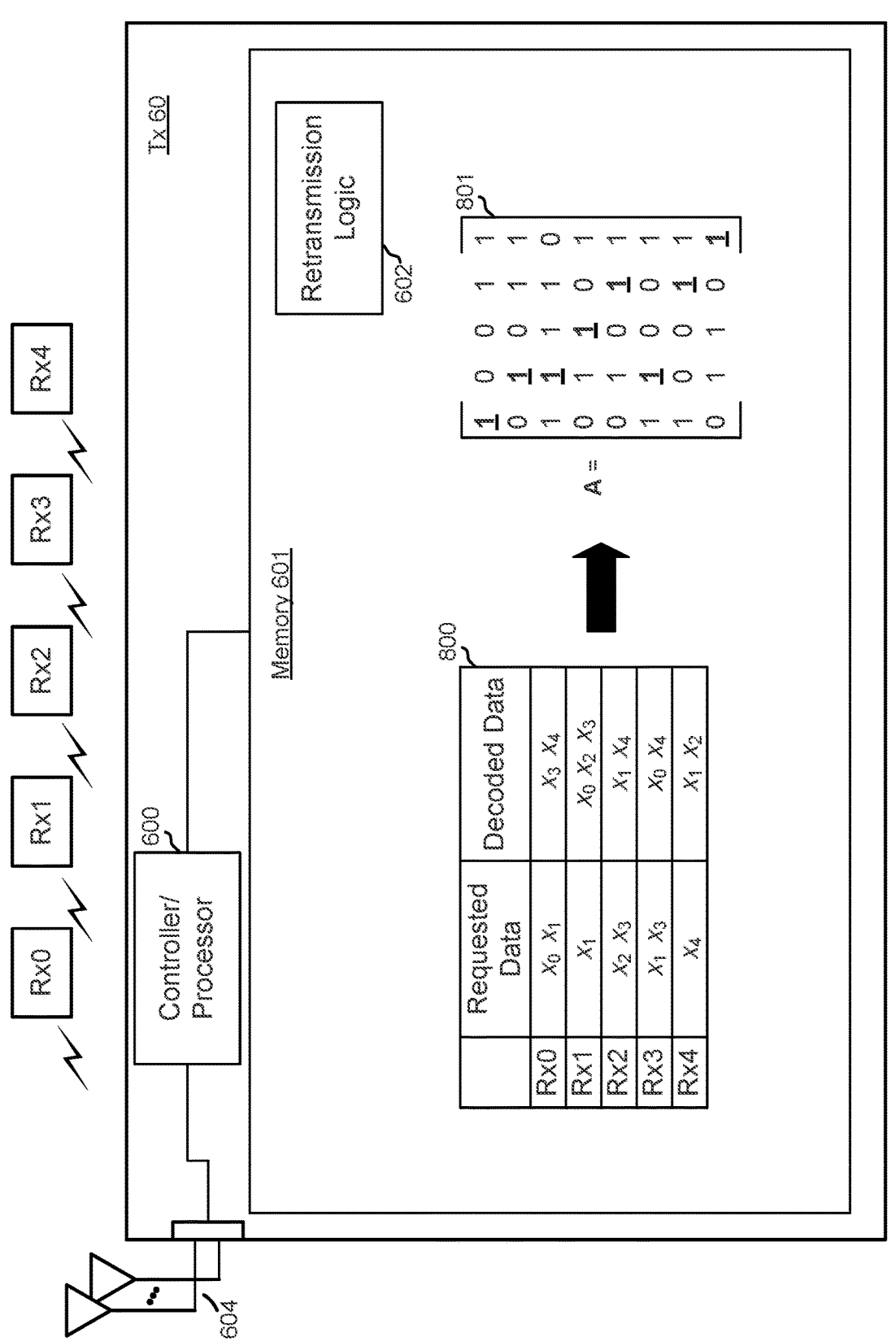
FIG. 8 is a block diagram illustrating an expanded detail of a transmitter, configured according to another aspect of the present disclosure, in communication with multiple receivers.

FIG. 8 is a block diagram illustrating an expanded detail of a transmitter 60, configured according to another aspect of the present disclosure, in communication with multiple receivers, Rx0-Rx4. In the example aspects illustrated and described with respect to FIGS. 6 and 7, the receivers, Rx0-Rx4, each only requested one data of the set of transmitted data. However, in additional scenarios, it may be common for one of receivers, Rx0-Rx4, to request retransmission of multiple data from the set of transmitted data. In such scenarios, the execution environment of retransmission logic 602 may provide a modified process for forming matrix A 801 from record 800. Because each receiver may request more than one data, matrix A 801 may include more than one row associated with the same receiver.

In operation, the execution environment of retransmission logic 602 provides for transmitter 60 to identify U receivers, Rx0-Rx4, requesting data, in which each such receiver, Rx0-Rx4, requested a data set $X_u$ and has decoded a data set $W_u$. In total, there are F data that are being requested by receivers, Rx0-Rx4, for retransmission. Matrix A 801 is defined with a size according to the following equation:

$$Size = \left( \sum_{u=0}^{U-1} |X_u| \right) \times F, \tag{3}$$

where $|X_u|$ represents the cardinal number of the set of data $X_u$.

Transmitter 60 then inputs an indication for the requested data to matrix A 801 according to the following relationship:
For the m-th data in set $X_u$, set $A_{(i,j)}=1$, where $$i = \sum_{v=0}^{u-1} |X_v| - 1 + m \text{ (when } u = 0, i = m - 1)$$

and j is the index of the m-th data in set $X_u$. (4)
The entries illustrated as $\underline{1}$ in matrix A 801 represent the indications for the requested data.

Transmitter 60 then inputs an indication for the decoded data to matrix A 801 according to the following relationship:
For the m-th data in set $W_u$, set $$A_{\left( \sum_{v=0}^{u-1} |X_v| : \sum_{v=0}^{u} |X_v| - 1, j \right)} = 1,$$

when u>0, and $A_{(0:|x_0|-1,j)}=1$, when u=0, where j is the index of the m-th data in set $W_u$. (5)

Transmitter 60 may then input an indication of the other entries of matrix A 801 as '0.' As indicated in FIG. 7, when generating the intermediate matrix C (not shown), the non-zero indications of the decoded data in matrix A may be changed to '0' in the intermediate matrix C in order to minimize the rank across all C.

After transmitter 60 finishes generating matrix A 801 for the receivers, Rx0-Rx4, which include receivers requesting multiple data, the process is the same as illustrated and described in FIG. 7. Transmitter 60 may generate the intermediate matrix C (not shown) based on matrix A 801, find a lower rank of intermediate matrix C, or find the minimum rank of C over all possible C, and then finds the row basis B (not shown) of the resulting final intermediate matrix C. Alternatively, transmitter 60 may find the row basis B (not shown) directly of matrix A 801, without first generating the intermediate matrix C. Transmitter 60 may then transmit the resulting network coded retransmission data to receivers, Rx0-Rx4, over the retransmission period.

Figure 9:
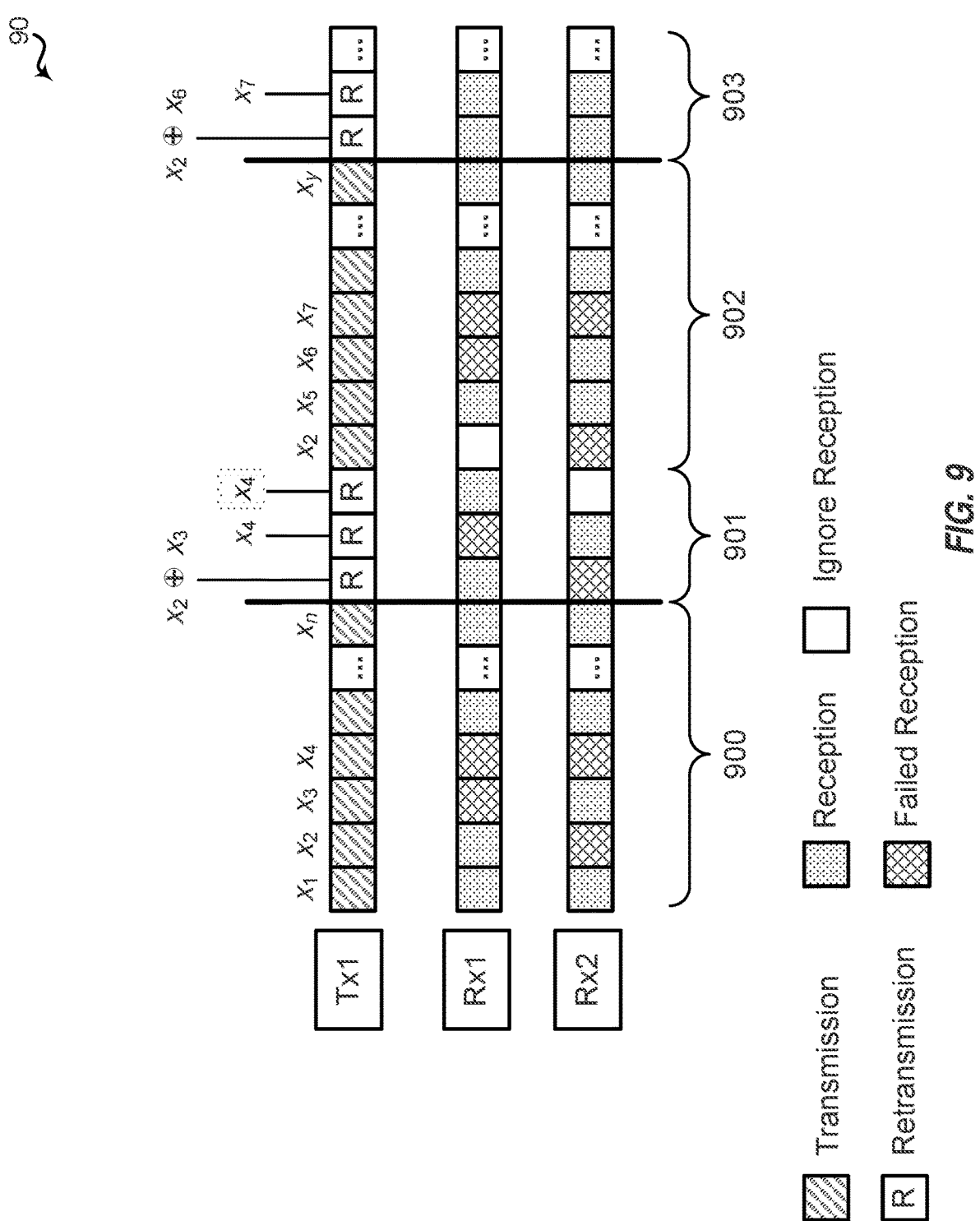
FIG. 9 is a block diagram illustrating a portion of a wireless network having transmitter and receivers configured according to one aspect of the present disclosure.

FIG. 9 is a block diagram illustrating a portion of wireless network 90 having transmitter, Tx1, and receivers, Rx1 and Rx2, configured according to one aspect of the present disclosure. According the various aspects of the present disclosure, Tx1 determines a length of new transmission period 900 and retransmission period 901 based either on the delay and buffer budgets of Rx1 and Rx2, which Rx1 and Rx2 would send to Tx1 periodically, or on the priority of the data, which informs Tx1 of the sensitivity of the data to delay. Tx1 then transmits the set of data, $x_0$-$x_n$ during new transmission period 900. During new transmission period 900, Rx1 and Rx2 will transmit acknowledgement feedback to Tx1 to report whether Rx1 and Rx2 received the corresponding data.

After new transmission period 900, Tx1 generates the number of network coded data for retransmission based on the requested data for retransmission and the decoded data of all requesting receivers, Rx1 and Rx2. The number of network coded data may be determined according to the illustrated and described aspects of FIGS. 6-8. Tx1 transmits the network coded retransmission data during retransmission period 901. Tx1 will also receive acknowledgement feedback from Rx1 and Rx2 for the network coded retransmission data. For example, Tx1 determines that two network coded data are to be transmitted during retransmission period 901, $x_2 \oplus x_3$ and $x_4$. Rx2 does not successfully receive $x_2$ and sends a NACK to Tx1, while Rx1 does not successfully receive $x_4$ in the subsequent slot and also sends a NACK to Tx1. Upon receiving the NACK from Rx2, Tx1 determines that the delay budget for $x_2$ will not allow an immediate retransmission during retransmission period 901. Accordingly, Tx1 reserves $x_2$ for the next transmission, new transmission 902. However, upon receiving the NACK from Rx1, Tx1 determines that the delay and buffer budget for Rx1 and $x_4$ will allow for an immediate retransmission. Tx1 would then retransmit $x_4$ in the following slot.

Tx1 again determines the length of the next transmission segment, new transmission period 902, and retransmission period 903, as indicated above. Tx1 then transmits data, $x_5$-$x_i$, in addition to $x_2$, which was not successfully received by Rx2 during either of new transmission period 900 or retransmission period 901. During new transmission period 902, Tx1 receives NACKs from Rx1 for $x_6$ and $x_7$, and from Rx2 for $x_2$ and $x_7$. After new transmission period 900, Tx1 determines the number of network coded data for retransmission according to one of the processes illustrated and described in FIGS. 6-8, and transmits those network coded data during retransmission period 903. According to the aspects described herein, Tx1 would transmit network coded data, $x_2 \oplus x_6$ and $x_7$, respectively, during retransmission period 903. Both of Rx1 and Rx2 transmit ACKs to Tx1 indicating successful receive of the network coded retransmissions.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIG. 4 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various aspects of the present disclosure may be implemented in many different ways, including methods, processes, non-transitory computer-readable medium having program code recorded thereon, apparatus having one or more processors with configurations and instructions for performing the described features and functionality, and the like. For example, a first aspect of wireless communication includes transmitting, by a transmitter, a set of data to a plurality of receivers over a predetermined transmission period; receiving, by the transmitter, acknowledgement feedback from the plurality of receivers for the set of data transmitted, wherein the acknowledgement feedback identifies one or more data requested for retransmission of the set of data by one or more requesting receivers of the plurality of receivers; determining, by the transmitter, a number of network coded data for retransmission to accommodate the one or more data requested for retransmission, wherein each network coded data includes a combination of one or more requested data of the one or more data requested for retransmission; and transmitting, by the transmitter, the number of network coded data during a predetermined retransmission period after the predetermined transmission period.

A second aspect, based on the first aspect, wherein the number of network coded data includes an original packet ID associated with transmission of the one or more requested data of the set of data transmitted during the predetermined transmission period.

A third aspect, based on the first aspect, further including determining a transmission duration of the predetermined transmission period and a retransmission duration of the predetermined retransmission period based on one of: a delay budget and a buffer budget of the plurality of receivers; or a delay sensitivity of the set of data.

A fourth aspect, based on the third aspect, further including receiving, by the transmitter, a budget report signal from the plurality of receivers, wherein the budget report signal includes identification of the delay budget and the buffer budget of the plurality of receivers.

A fifth aspect, based on the first aspect, wherein the determining the number of network coded data for retransmission includes generating, by the transmitter, a retransmission matrix, A, wherein each row of the retransmission matrix represents a vector identifying the one or more data requested for retransmission requested by a corresponding receiver of the one or more requesting receivers and one or more decoded data of the set of data successfully decoded by the corresponding receiver; reducing, by the transmitter, the retransmission matrix to a reduced retransmission matrix having a lower rank, r, than an original rank of the retransmission matrix, A; determining, by the transmitter, a row basis of the reduced retransmission matrix, wherein each row basis vector of the reduced retransmission matrix corresponds to a network coded data of the number of network coded data and entries of the each row basis vector correspond to the combination of the one or more requested data, and wherein the row basis of the reduced retransmission matrix includes r row basis vectors.

A sixth aspect, based on the fifth aspect, wherein the retransmission matrix is an n×m matrix, where a number of rows, n, is equal to a total number of receivers of the plurality of receivers, and a number of columns, m, is equal to a total number of data in the set of data.

A seventh aspect, based on the fifth aspect, wherein the reducing the retransmission matrix to a reduced retransmission matrix includes defining a reduced intermediate matrix, $C_{K \times K}$, of the retransmission matrix, $A_{K \times K}$, such that:

$$C_{(i,i)} = 1, \text{ for } 0 \le i \le K; \text{ and}$$

$$C_{(i,j)} = 0, \text{ if } A_{(i,j)} = 0; \text{ and}$$

replacing any nonzero non-diagonal entries of the reduced intermediate matrix with 0, when the replacing results in a further lower rank of the reduced intermediate matrix than the lower rank; and setting the reduced retransmission matrix equal to the reduced intermediate matrix after the defining and the replacing.

An eighth aspect, based on the seventh aspect, wherein the further lower rank includes a minimum rank, $r_{min}$.

A ninth aspect, based on the fifth aspect, wherein the generating the retransmission matrix, A, includes defining a size of the retransmission matrix, A, as an n×m matrix, according to:

$$n = \left( \sum_{u=0}^{U-1} |X_u| \right),$$

and m=F, where U represents a number of receivers of the one or more requesting receivers, u represents a receiver index of U, $X_u$ represents the one or more data requested for retransmission of the corresponding receiver, $|X_u|$ represents a number of the one or more data requested for retransmission of the corresponding receiver, and F represents a total number of the one or more data requested for retransmission by the one or more requesting receivers; inputting the one or more data requested for retransmission into the retransmission matrix, A, according to:

for an m-th data in $X_u$, set $A_{(i,j)}=1$, where:

$$i = \sum_{v}^{u-1} |X_v| - 1 + m,$$

and j=an index of the m-th data in $X_u$;

inputting the one or more decoded data into the retransmission matrix, A, according to:

for the m-th data in $W_u$, set $$A_{\left( \sum_{v=0}^{u-1} |X_v| : \sum_{v=0}^{u} |X_v| - 1, j \right)} = 1,$$

when u>0, and $A_{(0: |x_0|-1, j)}=1$, when u=0 where:

$W_u$ represents a number of the one or more decoded data, and j=an index of the m-th data in $W_u$; and setting all other entries of the retransmission matrix, A, to 0.

A tenth aspect, based on the first aspect, further including receiving, by the transmitter, subsequent acknowledgement feedback from the plurality of receivers for the number of network coded data transmitted, wherein the subsequent acknowledgement feedback identifies one or more additional data requested for retransmission of the number of network coded data by one or more additional requesting receivers of the plurality of receivers; determining, by the transmitter, a remaining transmission budget based on one or more of: a delay budget and a buffer budget of the one or more additional requesting receivers; immediately retransmitting, by the transmitter, the number of network coded data in response to a time for immediate retransmission falling with the remaining transmission budget; and adding, by the transmitter, the one or more additional data requested for retransmission to a subsequent transmission in response to the time for immediate retransmission exceeding the remaining transmission budget.

An eleventh aspect, based on the tenth aspect, wherein the adding the one or more additional data requested for retransmission includes transmitting, by the transmitter, a new set of data to the plurality of receivers over a subsequent predetermined transmission period, wherein the new set of data includes the one or more additional data requested for retransmission; receiving, by the transmitter, additional acknowledgement feedback from the plurality of receivers for the new set of data transmitted, wherein the additional acknowledgement feedback identifies one or more new data requested for retransmission of the new set of data by one or more subsequent requesting receivers of the plurality of receivers; determining, by the transmitter, a number of subsequent network coded data for retransmission to accommodate the one or more new data requested for retransmission, wherein each subsequent network coded data includes a combination of one or more requested new data of the one or more new data requested for retransmission; and transmitting, by the transmitter, the number of subsequent network coded data during a subsequent predetermined retransmission period after the subsequent predetermined transmission period.

A twelfth aspect including any combination of the first aspect through the eleventh aspect.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method of wireless communication, comprising:
transmitting, by a transmitter, a set of data to a plurality of receivers over a predetermined transmission period;
receiving, by the transmitter, acknowledgement feedback from the plurality of receivers for the set of data transmitted, wherein the acknowledgement feedback identifies one or more data segments of the set of data requested for retransmission by one or more requesting receivers of the plurality of receivers;
determining, by the transmitter, one or more combinations of data segments of the set of data, individual data segments of the one or more combinations of data segments corresponding to a data segment of the one or more data segments identified for retransmission by the acknowledgement feedback, a combination of data segments of the one or more combinations of data segments is determined in accordance with corresponding acknowledgement feedback of the acknowledgement feedback received from a corresponding receiver of the one or more requesting receivers, wherein the determining of the one or more combinations of data segments includes:
generating, by the transmitter, a retransmission matrix, A, wherein individual rows of the retransmission matrix represent vectors identifying:
the one or more data segments of the set of data requested for retransmission by a corresponding receiver of the one or more requesting receivers, and
one or more decoded data of the set of data successfully decoded by the corresponding receiver identified in the acknowledgement feedback;
reducing, by the transmitter, the retransmission matrix to a reduced retransmission matrix having a lower rank, r, than an original rank of the retransmission matrix, A; and
determining, by the transmitter, a row basis of the reduced retransmission matrix, wherein individual row basis vectors of the reduced retransmission matrix correspond to individual combinations of data segments of the one or more combinations of data segments, and entries of the individual row basis vectors correspond to the individual data segments of the one or more combinations of data segments, and wherein the row basis of the reduced retransmission matrix includes r row basis vectors;
encoding, by the transmitter, the combination of data segments of the one or more combinations of data segments into a corresponding network coded data segment; and
transmitting, by the transmitter, the corresponding network coded data segment for the combination of data segments of the one or more combinations of data segments during a predetermined retransmission period after the predetermined transmission period.

2. The method of claim 1, wherein the encoding the combination of data segments further includes:
including an original packet identifier (ID) associated with transmission of the data segment of the one or more data segments corresponding to the individual data segments of the one or more combinations of data segments to the individual data segments of the combination of data segments encoded into the corresponding network coded data segment.

3. The method of claim 1, further including:
determining a transmission duration of the predetermined transmission period and a retransmission duration of the predetermined retransmission period based on one of:
a delay budget and a buffer budget of the plurality of receivers; or
a delay sensitivity of the set of data.

4. The method of claim 3, further including:
receiving, by the transmitter, a budget report signal from the plurality of receivers, wherein the budget report signal includes identification of the delay budget and the buffer budget of the plurality of receivers.

5. The method of claim 1, wherein the retransmission matrix is an n×m matrix, where a number of rows, n, is equal to a total number of receivers of the plurality of receivers, and a number of columns, m, is equal to a total number of data segments in the set of data.

6. The method of claim 1, wherein the reducing the retransmission matrix to a reduced retransmission matrix includes:

defining a reduced intermediate matrix, $C_{K \times K}$, of the retransmission matrix, $A_{K \times K}$, such that:

$$C_{(i,i)} = 1, \text{ for } 0 \le i \le K; \text{ and}$$

$$C_{(i,j)} = 0, \text{ if } A_{(i,j)} = 0; \text{ and}$$

replacing any nonzero non-diagonal entries of the reduced intermediate matrix with 0, when the replacing results in a further lower rank of the reduced intermediate matrix than the lower rank; and setting the reduced retransmission matrix equal to the reduced intermediate matrix after the defining and the replacing.

7. The method of claim 6, wherein the further lower rank includes a minimum rank, $r_{min}$.

8. The method of claim 1, wherein the generating the retransmission matrix, A, includes:

defining a size of the retransmission matrix, A, as an n×m matrix, according to:

$$n = \left( \sum_{u=0}^{U-1} |X_u| \right), \text{ and } m = F,$$

or more requesting receivers, U represents a receiver index of U, $X_u$ represents the one or more data segments requested for retransmission of the corresponding receiver, $|X_u|$ represents a number of the one or more data segments requested for retransmission of the corresponding receiver, and F represents a total number of the one or more data segments requested for retransmission by the one or more requesting receivers;

inputting the one or more data segments requested for retransmission into the retransmission matrix, A, according to:

for an m-th data in $X_u$, set $A_{(i,j)}=1$, where:

$$i = \sum_v^{u-1} |X_v| - 1 + m, \text{ and}$$

j=an index of the m-th data in $X_u$;

inputting the one or more decoded data into the retransmission matrix, A, according to:

for the m-th data in $W_u$, set $$A_{\left( \sum_{v=0}^{u-1} |X_v| : \sum_{v=0}^{u} |X_v| - 1, j \right)} = 1,$$

when u>0, and $A_{(0:|x_0|-1,j)}=1$, when u=0 where:
$W_u$ represents a number of the one or more decoded data, and j=an index of the m-th data in $W_u$; and setting all other entries of the retransmission matrix, A, to 0.

9. The method of claim 1, further including:

receiving, by the transmitter, subsequent acknowledgement feedback from the plurality of receivers for the corresponding network coded data segment for the combination of data segments of the one or more combinations of data segments transmitted, wherein the subsequent acknowledgement feedback includes identification of one or more additional data segments transmitted in the corresponding network coded data segment of the one or more combinations of data segments requested for retransmission by one or more additional requesting receivers of the plurality of receivers;

determining, by the transmitter, a remaining retransmission budget based on one or more of: a delay budget and a buffer budget of the one or more additional requesting receivers;

retransmitting, by the transmitter, the one or more additional data segments in response to a time for retransmission falling within the remaining transmission budget; and adding, by the transmitter, the one or more additional data segments requested for retransmission to a subsequent predetermined transmission period in response to the time for immediate retransmission exceeding the remaining retransmission budget.

10. The method of claim 9, wherein the adding the one or more additional data segments requested for retransmission includes:

transmitting, by the transmitter, a new set of data to the plurality of receivers over a subsequent predetermined transmission period, the new set of data including the one or more additional data segments requested for retransmission;

receiving, by the transmitter, additional acknowledgement feedback from the plurality of receivers for the new set of data transmitted, wherein the additional acknowledgement feedback identifies one or more new data segment of the new set of data requested for retransmission by one or more subsequent requesting receivers of the plurality of receivers;

determining, by the transmitter, one or more new combinations of data segments of the new set of data, individual new data segments of the one or more new combinations of data segments correspond to a new data segment of the one or more new data segments identified for retransmission by the additional acknowledgement feedback, a new combination of data segments of the one or more new combinations of data segments is determined in accordance with corresponding additional acknowledgement feedback of the additional acknowledgement feedback received from the corresponding receiver of the one or more subsequent requesting receivers;

encoding, by the transmitter, the new combination of data segments of the one or more new combinations of data segments into a corresponding subsequent network coded data segment; and transmitting, by the transmitter, the corresponding subsequent network coded data segment for the new combination of data segments of the one or more new combinations of data segments during a subsequent predetermined retransmission period after the subsequent predetermined transmission period.

11. An apparatus configured for wireless communication, the apparatus comprising:

at least one processor; and a memory coupled to the at least one processor, wherein the at least one processor is configured:

to transmit, by a transmitter, a set of data to a plurality of receivers over a predetermined transmission period;

to receive, by the transmitter, acknowledgement feedback from the plurality of receivers for the set of data transmitted, wherein the acknowledgement feedback identifies one or more data segments of the set of data requested for retransmission by one or more requesting receivers of the plurality of receivers;

to determine, by the transmitter, one or more combinations of data segments of the set of data, individual data segments of the one or more combinations of data segments corresponding to a data segment of the one or more data segments identified for retransmission by the acknowledgement feedback, a combination of data segments of the one or more combinations of data segments is determined in accordance with corresponding acknowledgement feedback of the acknowledgement feedback received from a corresponding receiver of the one or more requesting receivers;

to encode, by the transmitter, the combination of data segments of the one or more combinations of data segments into a corresponding network coded data segment;

to transmit, by the transmitter, the corresponding network coded data segment for the combination of data segments of the one or more combinations of data segments during a predetermined retransmission period after the predetermined transmission period;

to receive, by the transmitter, subsequent acknowledgement feedback from the plurality of receivers for the corresponding network coded data segment for the combination of data segments of the one or more combinations of data segments transmitted, wherein the subsequent acknowledgement feedback includes identification of one or more additional data segments transmitted in the corresponding network coded data segment of the one or more combinations of data segments requested for retransmission by one or more additional requesting receivers of the plurality of receivers;

to determine, by the transmitter, a remaining retransmission budget based on one or more of: a delay budget or a buffer budget of the one or more additional requesting receivers;

to retransmit, by the transmitter, the one or more additional data segments in response to a time for retransmission falling with the remaining transmission budget; and to add, by the transmitter, the one or more additional data segments requested for retransmission to a subsequent predetermined transmission period in response to the time for retransmission exceeding the remaining retransmission budget.

12. The apparatus of claim 11, wherein the configuration of the at least one processor to encode the combination of data segments further includes configuration of the at least one processor:

to include an original packet identifier (ID) associated with transmission of the data segment of the one or more data segments corresponding to the individual data segments of the one or more combinations of data segments to the individual data segments of the combination of data segments encoded into the corresponding network coded data segment.

13. The apparatus of claim 11, further including configuration of the at least one processor to determine a transmission duration of the predetermined transmission period and a retransmission duration of the predetermined retransmission period based on one of:

34 a delay budget and a buffer budget of the plurality of receivers; or a delay sensitivity of the set of data.

14. The apparatus of claim 13, further including configuration of the at least one processor to receive, by the transmitter, a budget report signal from the plurality of receivers, wherein the budget report signal includes identification of the delay budget and the buffer budget of the plurality of receivers.

15. The apparatus of claim 11, wherein the configuration of the at least one processor to determine the one or more combinations of data segments includes configuration of the at least one processor:

to generate, by the transmitter, a retransmission matrix, A, wherein individual rows of the retransmission matrix represent a vector identifying the one or more data segments of the set of data requested for retransmission requested by a corresponding receiver of the one or more requesting receivers and one or more decoded data of the set of data successfully decoded by the corresponding receiver identified in the acknowledgement feedback;

to reduce, by the transmitter, the retransmission matrix to a reduced retransmission matrix having a lower rank, r, than an original rank of the retransmission matrix, A; and to determine, by the transmitter, a row basis of the reduced retransmission matrix, wherein individual row basis vectors of the reduced retransmission matrix correspond to individual combinations of data segments of the one or more combinations of data segments and entries of the individual row basis vectors correspond to the individual data segments of the one or more combinations of data segments, and wherein the row basis of the reduced retransmission matrix includes r row basis vectors.

16. The apparatus of claim 15, wherein the retransmission matrix is an n×m matrix, where a number of rows, n, is equal to a total number of receivers of the plurality of receivers, and a number of columns, m, is equal to a total number of data segments in the set of data.

17. The apparatus of claim 15, wherein the configuration of the at least one processor to reduce the retransmission matrix to a reduced retransmission matrix includes configuration of the at least one processor:

to define a reduced intermediate matrix, $C_{K \times K}$, of the retransmission matrix, $A_{K \times K}$, such that:

$$C_{(i,i)} = 1, \text{ for } 0 \le i \le K; \text{ and}$$

$$C_{(i,j)} = 0, \text{ if } A_{(i,j)} = 0; \text{ and}$$

to replace any nonzero non-diagonal entries of the reduced intermediate matrix with 0, when the configuration of the at least one processor to replace results in a further lower rank of the reduced intermediate matrix than the lower rank; and to set the reduced retransmission matrix equal to the reduced intermediate matrix after execution of the configuration of the at least one processor to define and configuration of the at least one processor to replace.

18. The apparatus of claim 17, wherein the further lower rank includes a minimum rank, $r_{min}$.

19. The apparatus of claim 15, wherein the configuration of the at least one processor to generate the retransmission matrix, A, includes configuration of the at least one processor:

to define a size of the retransmission matrix, A, as an n×m matrix, according to:

$$n = \left( \sum\nolimits_{u=0}^{U-1} |X_u| \right), \text{ and } m = F,$$

or more requesting receivers, u represents a receiver index of U, $X_u$ represents the one or more data segments requested for retransmission of the corresponding receiver, $|X_u|$ represents a number of the one or more data segments requested for retransmission of the corresponding receiver, and F represents a total number of the one or more data segments requested for retransmission by the one or more requesting receivers;

to input the one or more data segments requested for retransmission into the retransmission matrix, A, according to:

for an m-th data in $X_u$, set $A_{(i,j)}=1$, where:

$$i = \sum\nolimits_{v}^{u-1} |X_v| - 1 + m, \text{ and}$$

j=an index of the m-th data in $X_u$;

to input the one or more decoded data into the retransmission matrix, A, according to:

for the m-th data in $W_u$, set $$A_{\left(\sum_{v=0}^{u-1} |X_v| : \sum_{v=0}^{u} |X_v|-1, j\right)} = 1,$$

when u>0, and $A_{(0:|x_0|-1,j)}=1$, when u=0 where:

$W_u$ represents a number of the one or more decoded data, and j=an index of the m-th data in $W_u$; and to set all other entries of the retransmission matrix, A, to 0.

20. The apparatus of claim 11, wherein the configuration of the at least one processor to add the one or more additional data segments requested for retransmission includes configuration of the at least one processor:

to transmit, by the transmitter, a new set of data to the plurality of receivers over a subsequent predetermined transmission period, the new set of data including the one or more additional data segments requested for retransmission;

to receive, by the transmitter, additional acknowledgement feedback from the plurality of receivers for the new set of data transmitted, wherein the additional acknowledgement feedback identifies one or more new data segment of the new set of data requested for retransmission by one or more subsequent requesting receivers of the plurality of receivers;

to determine, by the transmitter, one or more new combinations of data segments of the new set of data, individual new data segments of the one or more new combinations of data segments corresponding to a new data segment of the one or more new data segments identified for retransmission by the additional acknowledgement feedback, a new combination of data segments of the one or more new combinations of data segments is determined in accordance with corresponding additional acknowledgement feedback of the additional acknowledgement feedback received from the corresponding receiver of the one or more subsequent requesting receivers;

to encode, by the transmitter, the new combination of data segments of the one or more new combinations of data segments into a corresponding subsequent network coded data segment; and to transmit, by the transmitter, the corresponding subsequent network coded data segment for the new combination of data segments of the one or more new combinations of data segments during a subsequent predetermined retransmission period after the subsequent predetermined transmission period.

21. A method of wireless communication, comprising:

transmitting, by a transmitter, a set of data to a plurality of receivers over a predetermined transmission period;

receiving, by the transmitter, acknowledgement feedback from the plurality of receivers for the set of data transmitted, wherein the acknowledgement feedback identifies one or more data segments of the set of data requested for retransmission by one or more requesting receivers of the plurality of receivers;

determining, by the transmitter, one or more combinations of data segments of the set of data, individual data segments of the one or more combinations of data segments corresponding to a data segment of the one or more data segments identified for retransmission by the acknowledgement feedback, a combination of data segments of the one or more combinations of data segments is determined in accordance with corresponding acknowledgement feedback of the acknowledgement feedback received from a corresponding receiver of the one or more requesting receivers;

encoding, by the transmitter, the combination of data segments of the one or more combinations of data segments into a corresponding network coded data segment;

transmitting, by the transmitter, the corresponding network coded data segment for the combination of data segments of the one or more combinations of data segments during a predetermined retransmission period after the predetermined transmission period;

receiving, by the transmitter, subsequent acknowledgement feedback from the plurality of receivers for the corresponding network coded data segment for the combination of data segments of the one or more combinations of data segments transmitted, wherein the subsequent acknowledgement feedback includes identification of one or more additional data segments transmitted in the corresponding network coded data segment of the one or more combinations of data segments requested for retransmission by one or more additional requesting receivers of the plurality of receivers;

determining, by the transmitter, a remaining retransmission budget based on one or more of: a delay budget and a buffer budget of the one or more additional requesting receivers;

retransmitting, by the transmitter, the one or more additional data segments in response to a time for retransmission falling within the remaining transmission budget; and adding, by the transmitter, the one or more additional data segments requested for retransmission to a subsequent predetermined transmission period in response to the time for immediate retransmission exceeding the remaining retransmission budget.

\* \* \* \* \*